US010054741B2

(12) United States Patent
    Smith

(10) Patent No.: US 10,054,741 B2
(45) Date of Patent: Aug. 21, 2018

(54) FIBER OPTIC ENCLOSURE ASSEMBLY

(71) Applicant: CommScope Technologies LLC, Hickory, NC (US)

(72) Inventor: Trevor D. Smith, Eden Prairie, MN (US)

(73) Assignee: COMMSCOPE TECHNOLOGIES LLC, Hickory, NC (US)

(*) Notice: Subject to any disclaimer, the term of this patent is extended or adjusted under 35 U.S.C. 154(b) by 0 days.

(21) Appl. No.: 15/292,841

(22) Filed: Oct. 13, 2016

(65) Prior Publication Data
    US 2017/0108648 A1    Apr. 20, 2017

Related U.S. Application Data

(60) Provisional application No. 62/241,493, filed on Oct. 14, 2015.

(51) Int. Cl.
    G02B 6/245    (2006.01)
    G02B 6/44     (2006.01)
    G02B 6/38     (2006.01)

(52) U.S. Cl.
    CPC .......... G02B 6/245 (2013.01); G02B 6/3897 (2013.01); G02B 6/4444 (2013.01); G02B 6/4478 (2013.01)

(58) Field of Classification Search
    CPC .............................. G02B 6/245; G02B 6/3897
    See application file for complete search history.

(56) References Cited

U.S. PATENT DOCUMENTS

| 5,577,150 A * | 11/1996 | Holder ................. G02B 6/4475 |
| | | 30/90.4 |
| 6,466,725 B2 | 10/2002 | Battey et al. |
| 6,526,858 B1 * | 3/2003 | Smith ...................... B26D 1/02 |
| | | 166/54.5 |
| 6,856,748 B1 | 2/2005 | Elkins, II et al. |
| 7,136,555 B2 | 11/2006 | Theuerkorn et al. |
| 7,228,036 B2 | 6/2007 | Elkins, II et al. |
| 7,266,274 B2 | 9/2007 | Elkins, II et al. |
| 7,942,590 B2 | 5/2011 | Lu et al. |
| 8,861,919 B2 * | 10/2014 | Alston ................. G02B 6/4442 |
| | | 385/135 |
| 2002/0057878 A1 * | 5/2002 | Takano ................ G02B 6/4475 |
| | | 385/100 |
| 2008/0019641 A1 | 1/2008 | Elkins, II et al. |
| 2009/0151167 A1 * | 6/2009 | Lu ........................ H02G 1/1217 |
| | | 30/90.8 |
| 2010/0166370 A1 | 7/2010 | Cody et al. |
| 2010/0319199 A1 * | 12/2010 | Mullaney ................. B26B 9/00 |
| | | 30/91.1 |

(Continued)

Primary Examiner — Daniel Petkovsek
(74) Attorney, Agent, or Firm — Merchant & Gould P.C.

(57) ABSTRACT

A telecommunications enclosure includes first and second generally aligned cable ports at opposing ends of the enclosure. A cable anchor at each of the first and second cable ports is for anchoring a fiber optic drop cable to the enclosure and to limit axial movement of the cable relative to the enclosure. A blade guide structure is positioned between the first and second cable ports, the blade guide structure configured to abut a portion of the cable extending between the first and second cable ports and defining at least a blade guide surface adapted to guide a cutting blade used for removing a portion of a cable jacket without damaging optical fibers of the cable.

14 Claims, 4 Drawing Sheets

(56) References Cited

U.S. PATENT DOCUMENTS

2016/0103290 A1     4/2016   Loeffelholz et al.
2016/0139341 A1*   5/2016   Morioka .............. G02B 6/3802
                                                                        385/69

* cited by examiner

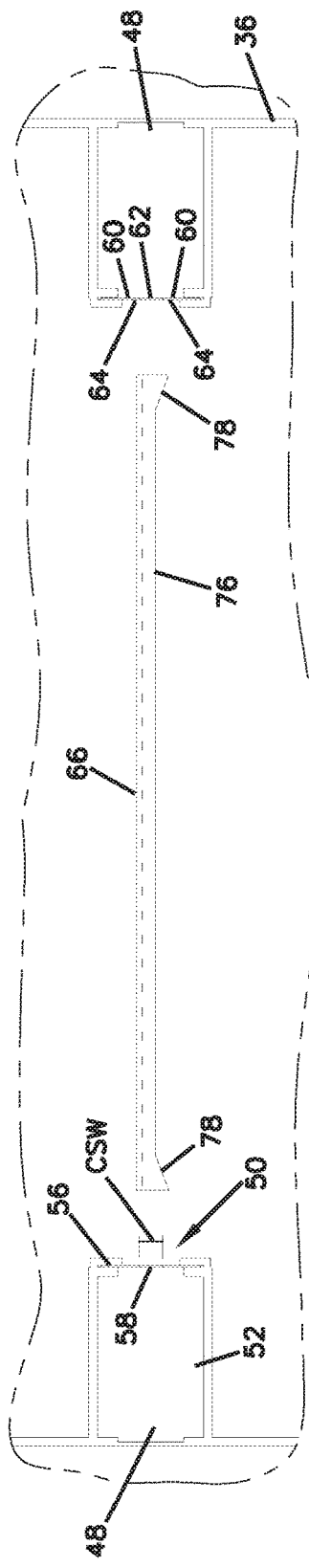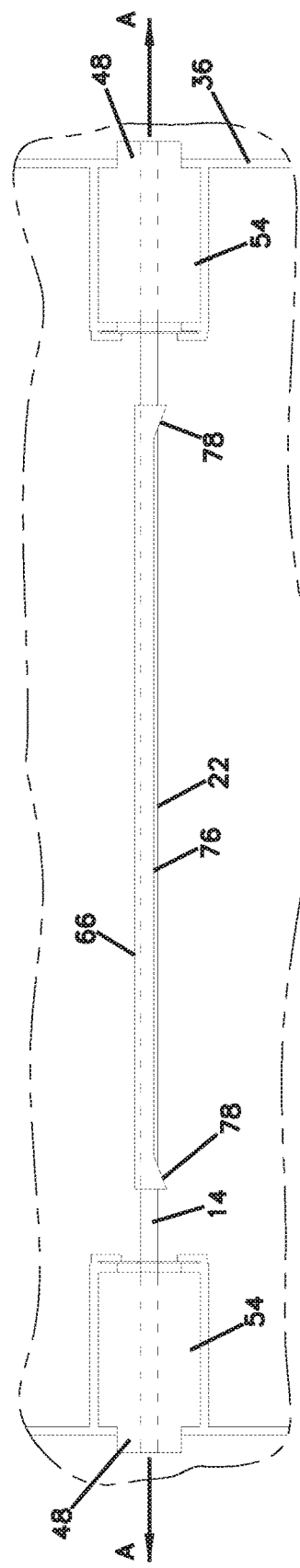

FIBER OPTIC ENCLOSURE ASSEMBLY

CROSS REFERENCE TO RELATED APPLICATIONS

The present application claims priority to U.S. Provisional Application Ser. No. 62/241,493, filed on Oct. 14, 2015, which application is hereby incorporated by reference in its entirety.

FIELD

The present disclosure relates generally to fiber optic cable enclosures and methods of using the same.

BACKGROUND

Optical networks are becoming prevalent in part because service providers want to deliver high bandwidth communication capabilities to customers. An example network may include one or more central offices that connect a number of end subscribers (also called end users) in a network. The central offices may additionally connect to a larger network such as the Internet and/or to a public switched telephone network (PSTN).

When leading a number of individual fibers to the premises of an end user, it is often necessary or desirable to enclose cable terminations or splices in environmentally sealed enclosures. For example, an operator may wish to enclose an optical fiber cable splice or termination. Some fiber optic cables, commonly referred to as "flat drop cables," are frequently used for fiber-to-the-home connections and may require splice enclosures. Fiber optic drop cables typically include one or more strength members, one or more optical fibers, a protective buffer tube surrounding the optical fiber(s), and an outer jacket surrounding the strength member(s) and the buffer tube. Known environmental splice enclosures typically secure each cable using clamps, bolts, or the like to prevent the cable from pulling out or pushing into the enclosure.

Improvements in forming fiber breakouts in such cables in the field and in assembling the sealed distribution enclosures are desired.

SUMMARY

The present disclosure relates generally to a sealed cable enclosure for enclosing one or more intermediate break-out locations at which various optical fibers of the cable can be accessed. The sealed cable enclosure can house cable terminations or splice locations and provide access to the break-out fibers from an exterior of the enclosure.

In accordance with some aspects of the disclosure, a drop cable includes optical fibers extending along a length, a jacket defining an access region to provide access to at least one of the optical fibers, and an enclosure disposed around the jacket to cover the access region. At least one of the optical fibers is cut to provide a first cut end and a second cut end. Both cut ends are routed out of the jacket through the access region. The first cut end is terminated at a first optical connector, and the second cut end is terminated at a second optical connector. The first and second optical connectors are positioned relative to the enclosure to be matable to optical cables that are external of the closure.

In some examples, the first and second optical connectors may be disposed within the enclosure. For example, the first and second optical connectors can be received at internal ports of ruggedized optical adapters carried by the enclosure. In certain implementations, the enclosure can include a two-piece, clam-shell configuration.

In some implementations, the first and second cut ends are directly terminated by the first and second optical connectors, respectively. In other implementations, the first and second cut ends are spliced to tether cables that are directly terminated by the first and second optical connectors, respectively, wherein the enclosure houses the splices or splice protectors.

According to another aspect of the disclosure, the enclosure may define first and second aligned cable ports, each including a cable anchor for anchoring the drop cable and to limit axial movement of the cable. A blade guide structure may be integrated into the enclosure between the cable ports for receiving the drop cable extending within the enclosure between the cable ports. The blade guide structure may define at least a blade guide surface adapted to guide a cutting blade used for removing a portion of the cable jacket without damaging optical fibers of the cable.

According to another aspect, the disclosure relates to a telecommunications enclosure assembly defining an enclosure and a fiber optic drop cable mounted the enclosure, the drop cable including a plurality of optical fibers extending along a length and a cable jacket surrounding the optical fibers. The enclosure includes first and second generally aligned cable ports at opposing ends of the enclosure, a cable anchor at each of the first and second cable ports for anchoring the fiber optic drop cable to the enclosure and to limit axial movement of the cable relative to the enclosure, and a blade guide structure positioned between the first and second cable ports, the blade guide structure configured to abut a portion of the cable extending between the first and second cable ports and defining at least a blade guide surface adapted to guide a cutting blade used for removing a portion of a cable jacket without damaging the optical fibers of the cable. A portion of the cable jacket that has been cut defines an access region to provide access to at least one of the optical fibers, at least one of the optical fibers cut to provide a first cut end and a second cut end, both cut ends being routed out of the jacket through the access region, the first cut end terminated with a first optical connector, and the second cut end terminated with a second optical connector, wherein the first and second optical connectors are positioned relative to the enclosure to be matable to optical cables that are external of the enclosure.

According to another aspect, the disclosure is directed to a method of adding a distribution point to an optical fiber network comprising selecting an optical fiber cable, abutting the optical fiber cable against a blade guide structure that defines blade guide surfaces positioned on opposing sides of the optical fiber cable when the optical fiber cable is against the blade guide structure, and using a blade to remove a portion of the jacket of the optical fiber cable by running the blade against the blade guide surfaces generally parallel to a longitudinal axis of the optical fiber cable.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 2 illustrates a portion of the enclosure of FIG. 1 defining cable entry ports and a blade guide structure of the enclosure;

FIG. 3 illustrates the enclosure of FIG. 2 with a cable mounted thereto;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
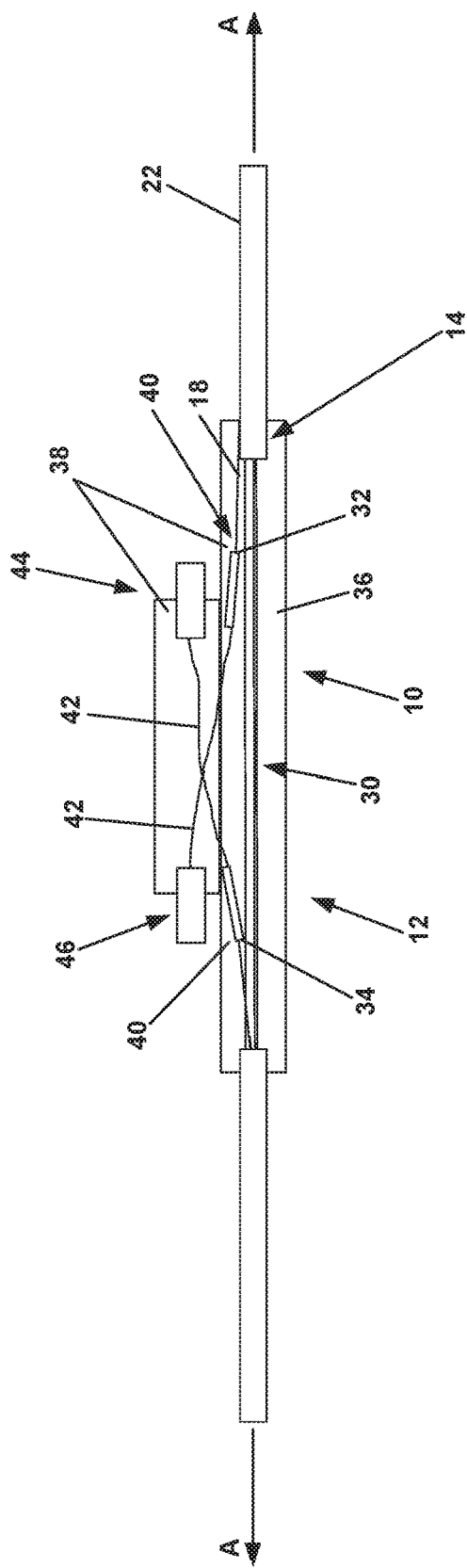
FIG. 1 illustrates a diagrammatic view of an example break-out location at an intermediate position along a length of a cable and an enclosure for enclosing and accessing the break-out fibers, the enclosure having features that are examples of inventive aspects in accordance with the disclosure.

The present disclosure relates generally to a telecommunications enclosure 10 and an enclosure assembly 12 for accessing one or more intermediate break-out locations of a fiber optic cable 14, the enclosure 10 and the enclosure assembly 12 having aspects that are examples of inventive features in accordance with the present disclosure. The enclosure assembly 12 including the enclosure 10 of the present disclosure is generally shown in FIGS. 1-3.

Figure 4:
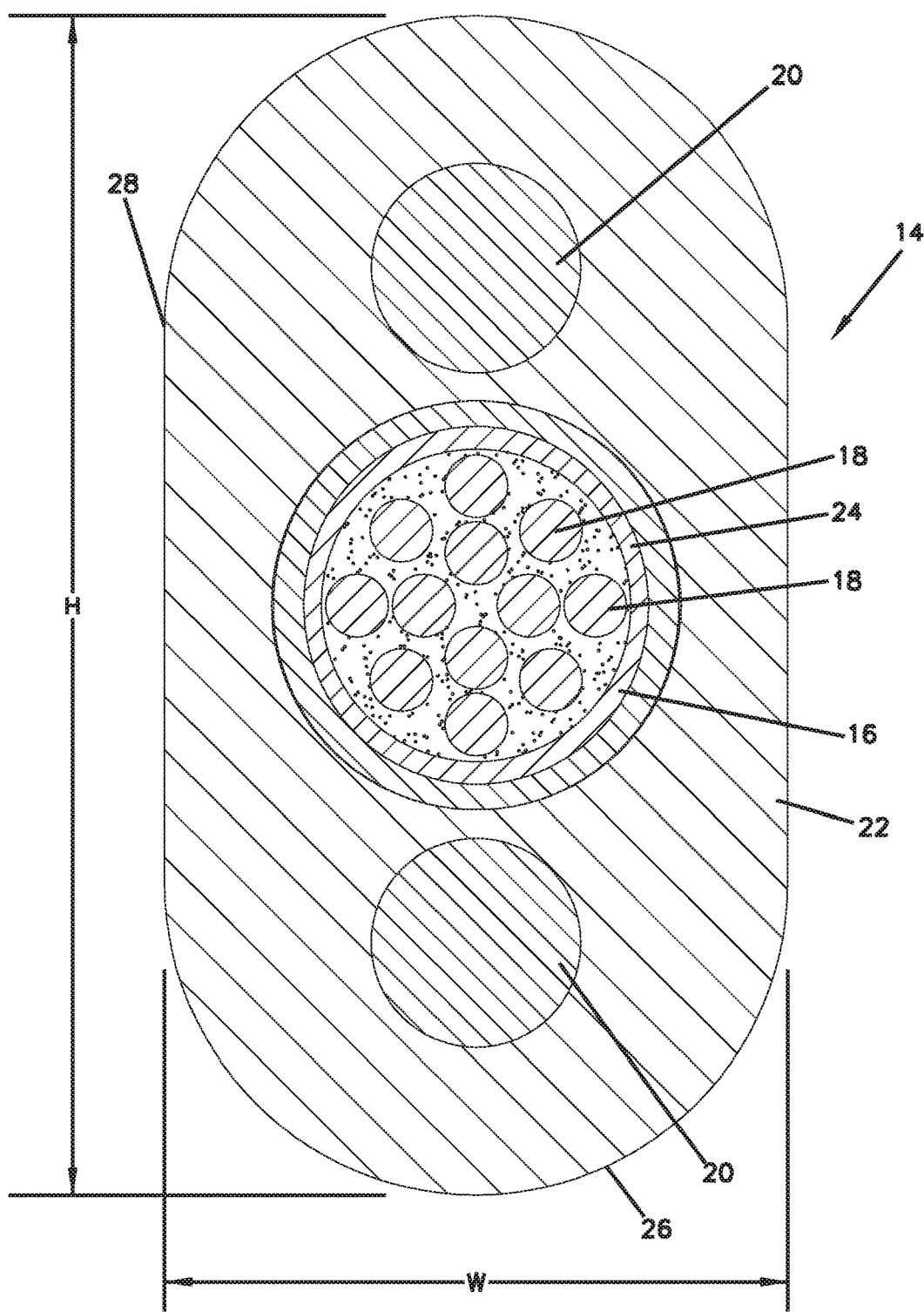
FIG. 4 illustrates a transverse cross-section of an example flat drop cable for use with the enclosure of FIGS. 1-3.

FIG. 4 illustrates the transverse cross-section of an optical cable 14 that may be mounted to the enclosure 10 of the present disclosure. The optical cable 14 is depicted as having a flat configuration and may be commonly referred to as a "flat drop cable." These types of cables are frequently used for fiber-to-the-home connections.

The flat cable configuration includes a central buffer tube 16 containing a plurality of fibers 18 (e.g., typically one to twelve loose or ribbonized fibers). Strength members 20 (e.g., flexible rods formed by glass fiber reinforced epoxy) are positioned on opposite sides of the central buffer tube 16. An outer jacket 22 surrounds the strength members 20 and the buffer tube 16. The outer jacket 22 includes an outer perimeter having an elongated transverse cross-sectional shape. An additional strength layer 24 (e.g., Kevlar®) can be positioned between the buffer tube 16 and the outer jacket 22. As shown at FIG. 4, the transverse cross-sectional shape includes oppositely positioned, generally parallel sides interconnected by rounded ends.

In the depicted embodiment, the cable 14 defines a longitudinal or lengthwise cable axis A-A (FIGS. 1 and 3), a cross-sectional width dimension W (FIG. 4), and a cross-sectional height dimension H (FIG. 4) that is greater than the width dimension W. The cross-dimensional width W of the cable 14 is defined across a minor side 26 of the cable 14, and the cross-sectional height dimension H of the cable 14 is defined across a major side 28 of the cable 14.

In providing a break-out, the outer jacket 22 of the cable 14 may define an access region 30 located at an intermediate position along the length of the cable 14. At the access region 30, a portion of the jacket 22 is normally removed to provide access to the optical fibers 18 therein. In some examples, a window may need to be cut through the wall of the jacket 22 to provide access to the optical fibers 18 within the jacket 22. After the window is cut, a portion of the buffer tube 16 is removed at the access region 30 to provide access to the optical fibers 18 within the buffer tube 16.

After a portion of the buffer tube 16 is cut, at least one optical fiber 18 of the cable 14 is accessed and cut at the access region 30. The first cut end 32 of the optical fiber 18 is terminated by a first optical connector. The second cut end 34 of the optical fiber 18 is terminated by a second optical connector. The enclosure 10 encloses the access region 30 of the cable 14. And, as will be described in further detail below, the enclosure 10 also includes features that facilitate initial removal of a portion of the jacket 22 by a field technician to create the access region 30 for accessing the buffer tube 16 and the fibers 18.

In certain implementations, the enclosure 10 may define a first housing piece 36 (i.e., a base portion) that is positioned partially around the jacket 22 at the access region 30. A second housing piece 38 (i.e., a cover portion) may be positioned partially around the jacket 22 so that the first and second housing pieces 36, 38 cooperate to form the enclosure 10 that surrounds the jacket 22 and covers the access region 30. In certain examples, as shown in FIG. 1, the first and second optical connectors may be routed towards opposite ends of the enclosure 10.

The housing pieces 36, 38 may each be formed of any suitable material. According to some embodiments, the housing pieces 36, 38 are formed of a polymeric material. Suitable polymeric materials may include, polypropylene and its derivatives, or polycarbonate, for example.

As noted above, each cut end 32, 34 of the optical fiber 18 may be terminated by an optical connector. In an example, a single-fiber connector (e.g., an LC connector, an SC connector, a DLX connector, and LX.5 connector, etc.) may be terminated to each cut end 32, 34 of the optical fiber 18. As the term is used herein, "terminated" refers to optically coupling the cut end 32, 34 to an optical connector either directly or indirectly. In some examples, the cut end 32, 34 can be directly terminated to the optical connector. In such examples, the optical connector is mounted directly to the cut end 32, 34. In other examples, the cut end 32, 34 can be spliced at a splice location 40 to an optical stub or tether fiber 42 that is directly terminated by an optical connector.

Still referring to FIG. 1, in some examples, the first optical connector may be plugged into an interior port of a first ruggedized optical adapter 44 carried by the enclosure 10, and the second optical connector may be plugged into an interior port of a second ruggedized optical adapter 46 carried by the enclosure. In the depicted example, the ruggedized adapters 44, 46 are carried by the cover portion 38 of the enclosure 10.

As the term is used herein, an "optical adapter" is a structure configured to align at least one optical fiber of a first optical connector with at least one fiber of a second optical connector so that optical signals may be passed therebetween. Each optical adapter 44, 46 is disposed on the enclosure 10 so that a first port of the optical adapter 44, 46 (i.e., an external port) is accessible externally of the enclosure 10 and a second port of the optical adapter 44, 46 (i.e., an internal port) is accessible internally of the enclosure 10.

In accordance with some aspects of the disclosure, the connection system between the optical adapter and the optical connector can be ruggedized for each end of the cut fiber 18. As the term is used herein, a connection is "ruggedized" when the optical connector and optical adapter are configured to environmentally seal together and are configured to robustly connect together. As the term is used herein, a "robust connection" refers to a connection of an optical connector to an optical adapter such that the optical connector can withstand an axial load of at least 100 pounds without pulling out of the optical adapter. In certain examples, a robust connection structure includes twist-to-lock connections. In an example, a twist-to-lock connection includes a bayonet connection. In another example, a twist-to-lock connection includes a threaded connection.

As the term is used herein, an optical adapter is "ruggedized" when the optical adapter environmentally seals to the enclosure (e.g., using a gasket) and when at least one port of the optical adapter is configured to provide a ruggedized connection to an optical connector received at the port. In some examples, a ruggedized port can include a seal (e.g., a gasket) disposed therein to press against an optical connector received in the port. In other examples, the ruggedized port can include a wall or other structure against which a seal on the connector may press when the connector is received at the port.

In the example shown in FIG. 1, the optical adapters 44, 46 that are mounted on the cover portion 38 of the enclosure 10 are ruggedized optical adapters. Each of the optical adapters 44, 46 may include a first seal disposed between an exterior of the optical adapters 44, 46 and the enclosure 10. The optical adapters 44, 46 may include a ruggedized external port. The optical adapters 44, 46 may include a second seal disposed within the external port. The optical adapters 44, 46 may also include a robust connection structure at the external port. In certain embodiments, the optical adapters 44, 46 may include external threads. In other examples, the optical adapters 44, 46 can include internal threads, a bayonet connection, or any other connection structure capable of withstanding a pull-out force of at least about 100 pounds.

According to certain embodiments, the optical adapters 44, 46 that are provided on the enclosure 10 may be DLX format adapters. Further details relating to DLX type adapters are described in U.S. Pat. No. 7,942,590, which is incorporated herein by reference in its entirety.

Also, it should be noted that the connectors terminated to the cut ends 32, 34 of the fiber 18 may simply be provided as pigtails (e.g., tether cables) and routed out of the access region 30 and the enclosure 10 without mating internally with optical adapters. For example, in certain implementations, the enclosure 10 may include a heat recoverable portion that environmentally seals the pigtails (e.g., tether cables) that extend out of the enclosure 10, wherein the enclosure does not enclose the first and second optical connectors terminated to the cut ends 32, 34 of the fiber. Examples of such implementations are described in further in detail in U.S. Patent Publication No. 2016/0103290, the entire disclosure of which is incorporated herein by reference.

As noted above, the first cut end 32 of the accessed fiber 18 can be directly terminated by the first optical connector, and the second cut 34 end can be directly terminated by the second optical connector. However, in other examples, such as that shown in FIG. 1, the first cut end 32 can be optically coupled via a splice 40 (e.g., mechanically spliced, fusion spliced, etc.) to a first stub or tether fiber 42 that is directly terminated by the first optical connector; and the second cut end 34 can be optical coupled via a splice 40 (e.g., mechanically spliced, fusion spliced, etc.) to a second stub or tether fiber 42 that is directly terminated by the second optical connector.

Figure 5:
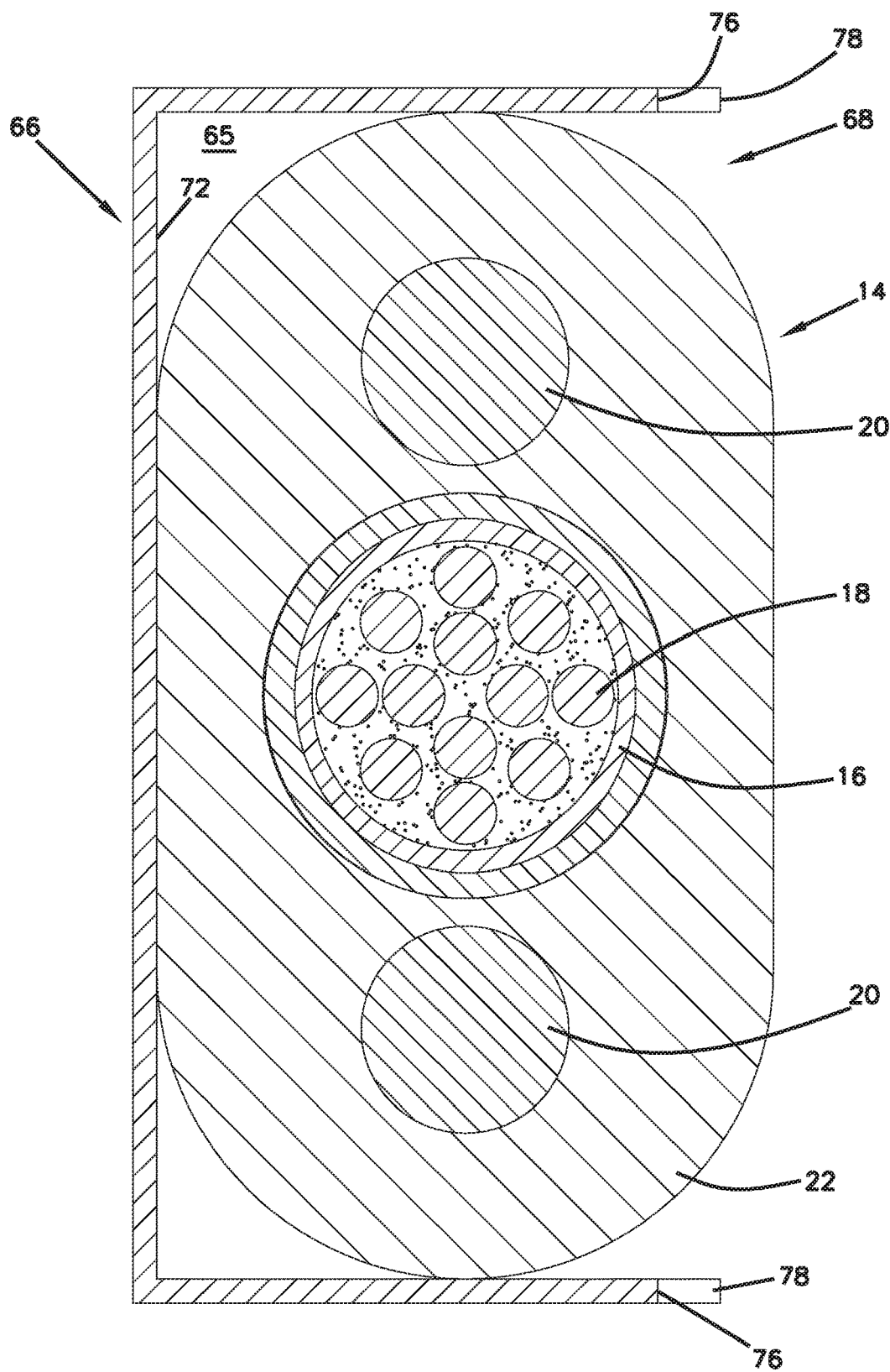
FIG. 5 illustrates the cross-section of the cable of FIG. 4 when the cable has been placed within the blade guide structure of the enclosure of FIGS. 1-3.

As noted previously, flat drop cables 14 such as that illustrated in FIGS. 4-5 are frequently used for fiber-to-the-home connections. In certain examples, the opposite ends of the drop cable 14 can be optically coupled to one or more central offices from which optical signals are provided to the optical network. For example, the cut optical cable 14 can carry a first optical signal from a central office from the first end of the cable 14 to the first cut end 32, and the cut optical cable 14 can carry a second optical signal from a central office from the second end of the cable 14 to the second cut end 34. In an example, each end of the cable may connect to a different central office. In another example, the ends of the cable 14 may connect to the same central office. The cut ends of the optical cable 14 can be optically coupled to cables leading to subscribers or other distribution points in the network. Accordingly, the optical signals can be provided to the subscribers from the central office(s) at either end of the drop cable 14.

In providing the distribution path, cut ends 32, 34 of one or more optical fibers 18 are routed out of the jacket 22 and to the internal ports of the optical adapters 44, 46. The first optical connector is plugged into the internal port of the first optical adapter 44 and the second optical connector is plugged into the internal port of the second optical adapter 46. As shown, in some implementations, the ruggedized adapters 44, 46 can be disposed at opposite ends of the enclosure 10.

Now referring specifically to FIG. 1, when the cable 14 is mounted to the enclosure 10 of the present disclosure, the base and the cover portions 36, 38 of the enclosure 10 can be sealed to each other and the cable jacket 22 (e.g., via a gel seal, elastomeric gasket, adhesive, tape, a heat-recoverable sleeve, etc.) to form a sealed enclosure 10. The first housing piece 36 (i.e., a base portion) and the second housing piece 38 (i.e., a cover portion) cooperate (e.g., via a clam-shell configuration) to surround the cable 14 at the access region 30.

In addition to providing a seal for the access region 30, the enclosure 10 also provides a mechanism for resisting pull out of the cable 14 from the enclosure 10 as will be described.

Referring now to FIGS. 2-3, in the depicted embodiment, the enclosure 10 defines two generally aligned cable openings or ports 48 at opposing ends of the enclosure 10 such that when the drop cable 14 enters the enclosure 10 through the openings 48, the access region 30 of the drop cable 14 is positioned within the enclosure 10. The cable openings 48 may be located on the base portion 36 of the enclosure 10 and sealed via the cover portion 38 of the enclosure 10 in forming the clam-shell like configuration.

As will be described in further detail below, each cable opening 48 may include a strain relief feature 50 for axially fixing the cable 14 to the enclosure 10 at the cable openings 48. When the cover portion 38 of the enclosure 10 is mounted on the base portion 36 of the enclosure 10, a flowable perimeter sealant may be used to provide a moisture-proof seal to the interior chamber of the enclosure 10.

According to some embodiments, the sealant may be initially provided only in the base portion 36, and the cover 38 may be mounted to cooperate with the base portion 36 to compress the sealant around the perimeter of the enclosure 10. Alternatively, the base and the cover 36, 38 may each include a sealant.

It should be noted that the cover portion 38 and the base portion 36 of the enclosure 10 may be separate pieces that are mounted together via a clamp structure, or the two portions 36, 38 may be attached via a hinge structure allowing a pivotable mount therebetween.

Now referring to FIGS. 2-3 specifically, the cable ports 48 may define a gel pocket or sealant cavity 52 for providing a seal for the cable 14 mounted to the enclosure 10. A mass of cable sealant may be disposed in each sealant cavity 52 in addition to a solid foam type sealant 54 provided around the cable 14 (as shown, for example, in FIG. 3).

As noted above, each cable port 48 may also define a strain relief structure 50 for axially fixing the cable 14 at the opposing cable ports 48 and positioning the access region 30 of the cable 14 within the interior chamber of the enclosure 10. Each cable port 48 defines a strain relief holding slot 56 for receiving the strain relief member 50. In the depicted embodiment, the strain relief member 50 may define a U-shaped structure including a base strip 58 and a pair of upstanding opposed side posts 60 that define a cable entrance slot 62 therebetween. The cable slot 62 defines an open end at the top of the strain relief member 50. Each side post 60 defines a fixation edge 64 flanking the cable slot 62 such that when the drop cable 14 is inserted into the cable slot 62 in a direction from top to bottom, the fixation edges 64 dig into the outer jacket 22 of the drop cable 14 in fixing the cable 14 axially.

In the depicted embodiment, each strain relief member 50 defines a cable slot 62 that is sized to generally receive the minor side 26 of the cable 14 such that the cable 14 is inserted into the slot 62 with the cross-sectional height dimension H positioned generally perpendicular to the bottom surface of the base portion 36 of the enclosure 10. The cable slot 62 defines a width CSW that is generally smaller in dimension than the cross-sectional width dimension W of the drop cable 14 such that the fixation edges 64 dig into the outer jacket 22 and axially fix the drop cable 14 with respect to the cable ports 48.

The strain relief device 50 formed of the base strip 58 and the side posts 60 may be press fit into the strain relief slot 56. In certain embodiments, the strain relief device 50 may be press-fit into its respective slot 56 prior to fixing the cable 14 thereto. In other embodiments, each strain relief device 50 may be fixed to the cable 14 prior to being inserted into its respective slot 56. It should be noted that since the strain relief devices 50 may be removable structures and may be mounted to the enclosure 10 after receiving the cable 14, the cable receiving slots 62 of the devices 50 do not have to be positioned facing upwardly when the strain relief devices 50 and the cable 14 are eventually mounted to the enclosure 10. The strain relief device 50 may be inserted into the strain relief slot 56 with the cable receiving slot 62 facing sideways since the strain relief device 50 can be press fit after the cable 14 has been fixed. In the embodiment depicted in FIGS. 2-3, the cable receiving slot 62 is positioned facing upwardly but as discussed, this orientation can be rotated 90 degrees.

Regarding the width CSW and the height of the cable slot 62, according to some embodiments, the width CSW is generally less than the cross-dimensional width W of the smallest cable intended for use with the enclosure 10. And, the height is generally dimensioned to receive and accommodate the major side 28 of the largest cable intended for use with the enclosure 10.

As noted above, the drop cable 14 is aligned with each of the cable ports 48 and its associated strain relief device 50. The cable 14 is then pressed downwardly so that the jacket 22 slides into the cable slots 62 of the strain relief members 50 and any cable sealant that may be positioned within the gel pocket 52. In other embodiments, as discussed above, a solid, foam-type sealant 54 may also be used for the cable 14.

The cable 14, when inserted into the gel pocket 52, displaces the cable sealant so that the portion of the cable 14 in the sealant cavity 52 becomes at least partially surrounded by the cable sealant. The cable 14 may form a sealant void or trough in the cable sealant.

The cable 14 enters the cable slot 62 through the top opening. The relative shapes of the cable 14 and the slot 62 ensure that the cable 14 slides into the cable slot 62 and is properly oriented during insertion. The opposed side posts 60 of the strain relief device 50 may be slightly flexible such that they deflect or flare inwardly (i.e., away from the cable port 48 to expand to accommodate the cable width W). The fixation edges 64 of the posts 60 may cut radially into the outer jacket 22 of the cable 14 a nominal distance. Preferably, the cut depth is such that the buffer tube 16 including the fibers 18 and the strength members 20 are not damaged.

The strain relief member 50 may reliably and satisfactorily secure the cable 14 at each port 48 without requiring the use of bolts, clamps, or the like. The cable 14 is strain relieved and pull out is limited or prevented by the strain relief member 50. The fixation edges 64 may function like barbs and grip the cable 14 more tightly when the cable 14 is pulled away from the enclosure 10, thereby preventing axial withdrawal of the cable 14 from the enclosure 10.

Referring to FIGS. 2, 3, and 5, as noted above, the enclosure 10 may include features that facilitate removal of a portion of the jacket 22 for accessing the buffer tube 16 and the fibers 18 once the cable 14 has been axially fixed relative to the enclosure 10. In the depicted embodiment of the enclosure 10 and the cable 14 used therein, since the fiber bundle 18 is positioned in between the strength members 20, a major side 28 of the cable 14 can be cut/peeled to access the buffer tube 16 while maintaining the strength members 20 in place.

A blade guide structure 66 may be provided within the enclosure 10, positioned between the cable ports 48 to facilitate removal of a portion of the major side 28 of the cable jacket 22. The blade guide structure 66, as shown in FIGS. 2, 3, and 5, defines a generally U-shaped structure with a cable receiving opening 68 facing laterally. The base 70 of the U-shaped guide structure 66 defines an abutment surface 72 for the cable 14, and the posts 74 of the U-shaped guide structure define blade guiding surfaces 76. When the cable 14 has been axially fixed with respect to the enclosure 10, an intermediate portion of the cable 14 that is going to define the access region 30 is inserted into a pocket 65 of the blade guide 66. Once the cable 14 has been inserted so as to abut the abutment surface 72 of the blade guide 66, the top and bottom blade guiding surfaces or edges 76 can be used to guide a blade tool to strip or peel a portion of the major side 28 of the outer jacket 22 parallel to the longitudinal axis A-A of the cable 14.

In FIG. 2, the blade guide structure 66 is shown within the enclosure 10 without a cable 14 inserted therein. In FIG. 3, the blade guide structure 66 is shown with the cable 14 inserted therein, ready for the stripping operation.

As shown in the cross-sectional view in FIG. 5, the blade guide surfaces 76 are configured to position the blade tool such that a portion of the major side 28 of the jacket 22 is removed without damaging the strength members 20 or the fibers 18 within the buffer tube 16. It should be noted that the depth of the pocket 65 formed by the U-shaped guide structure 66 may be sized accordingly such that the blade tool either cuts just into the buffer tube 16 without contacting the fibers 18 or comes close enough to the buffer tube 16 so that the buffer tube 16 can be accessed for processing at least one of the fibers 18 therein.

As shown in the top view of the guide 66 in FIGS. 2 and 3, the blade guide structure 66 can define guide surfaces 76 having portions 78 angling in toward the pocket 65 of the guide structure 66 for providing an initial starting surface for the blade tool.

It should be noted that the depth of the pocket 65 of the U-shaped blade guide 66 structure may be sized in various dimensions depending upon the size and type of cable 14 being used.

Even though the blade guide structure 66 is shown and described herein to have a cable receiving opening 68 that faces laterally, in other embodiments of the enclosure, wherein the strain relief devices 50 are removable and are mounted to the enclosure 10 after fixing the cable 14, the blade guide structure 66 may be oriented 90 degrees from that shown in FIGS. 2 and 3. For example, the cable receiving opening 68 may face upwardly and the cable 14 inserted in a downward direction if the major side 28 of the cable 14 is oriented facing upwardly. In this manner, the guiding surfaces 76 would guide a blade tool horizontally (versus vertically) in stripping a portion of the major side 28 of the outer jacket 22.

Once a portion of the outer jacket 22 is removed using the blade guide 66 and a window is created, as noted above, the cable 14 is further processed by removing a portion of the buffer tube 16 at the access region 30 to provide access to the optical fibers 18 within the buffer tube 16. At least one fiber 18 is cut. The first cut end 32 of the accessed fiber 18 can be directly terminated by the first optical connector, and the second cut end 34 can be directly terminated by a second optical connector. However, as noted above, in other examples, such as that shown in FIG. 1, the first cut end 32 can be optically coupled via a splice 40 to a first stub or tether fiber 42 that is directly terminated by the first optical connector, and the second cut end 34 can be optically coupled via a splice 40 to a second stub or tether fiber 42 that is directly terminated by the second optical connector. The first and second connectors may then be mated to the adapters 44, 46 provided on the cover portion 38 of the enclosure 10 for accessing the break-out signals from an exterior of the enclosure 10.

After the cable 14 mounted in the base portion 36 has been processed, the cover portion 38 is then mounted thereon. As noted above, according to some embodiments, the housing pieces 36, 38 may be pre-coupled by a hinge mechanism or another suitable releasable or permanent clamp mechanism.

The enclosure 10 effectuates a perimeter environmental seal and environmental seals about each of the cable ports 48. The perimeter seal may be maintained so long as the portions of the enclosure 10 remain interlocked. The elastic memory and the retained or restoring force in the elongated, elastically deformed gel generally causes the gel to bear against the mating surfaces of the enclosure 10 and of the cable 14. Also, the tack of the gel may provide adhesion between the gel and these surfaces. The gel, even though it is cold-applied, is generally able to flow about the cable 14 and the portions of the enclosure 10 to accommodate any irregular geometries.

It should be noted that the enclosure 10, with the use of the blade guide structure 66, allows laying out all of the cabling along the distribution path on day one and creating a break-out location in the field when needed for a subscriber on day two.

While cables having optical fibers as transmission media have been disclosed herein, according to further embodiments, cables having other types of transmission media (e.g., electrical conductors formed of copper or other metal) may be used with the inventive features provided in the present disclosure.

The above specification, examples and data provide a complete description of the manufacture and use of the structure of the inventive features. Since many embodiments of the disclosure can be made without departing from the spirit and scope thereof, the inventive features reside in the claims hereinafter appended.

What is claimed is:

1. A telecommunications enclosure comprising:
   first and second aligned cable ports at opposing ends of the enclosure;
   a strain relief member at each of the first and second cable ports for anchoring a fiber optic drop cable to the enclosure and to limit axial movement of the fiber optic drop cable relative to the enclosure; and
   a blade guide structure positioned between the first and second cable ports, the blade guide structure configured to abut a portion of the fiber optic drop cable extending between the first and second cable ports, and defining at least one or more initial starting surfaces and a blade guide surface adapted to guide a cutting blade used for removing a portion of a cable jacket without contacting optical fibers of the fiber optic drop cable; wherein the one or more initial starting surfaces angle in toward the blade guide surface.

2. The enclosure of claim 1, further comprising a base portion and a cover portion configured to seal an interior of the enclosure containing the cut portion of the fiber optic drop cable.

3. The enclosure of claim 1, wherein the first and second cable ports include a seal around the fiber optic drop cable.

4. The enclosure of claim 1, further comprising at least one fiber optic adapter mounted on the enclosure for accessing a signal of a fiber broken-out from the fiber optic drop cable within the enclosure.

5. The enclosure of claim 1, wherein the fiber optic drop cable is mounted to the enclosure, the fiber optic drop cable including a plurality of optical fibers extending along a length, the cable jacket surrounding the optical fibers.

6. The enclosure of claim 5, wherein a portion of the cable jacket has been cut to define an access region to provide access to at least one of the optical fibers, at least one of the optical fibers cut to provide a first cut end and a second cut end, both cut ends being routed out of the jacket through the access region, the first cut end being terminated with a first optical connector, and the second cut end being terminated with a second optical connector, wherein the first and second optical connectors are positioned relative to the enclosure to be matable to optical cables that are external of the enclosure.

7. The enclosure of claim 6, wherein the first cut end is directly terminated to the first optical connector, and wherein the second cut end is directly terminated to the second optical connector.

8. The enclosure of claim 6, wherein the first cut end is optically spliced to a first optical stub fiber that is directly terminated to the first optical connector, and wherein the second cut end is optically spliced to a second optical stub fiber that is directly terminated to the second optical connector.

9. The enclosure of claim 6, wherein the first and second optical connectors are plugged into interior ports of ruggedized optical adapters.

10. The enclosure of claim 9, wherein the ruggedized optical adapters of the enclosure face in opposite directions.

11. The enclosure of claim 1, wherein the strain relief members define cable slots for receiving the cable jacket with a press fit.

12. The enclosure of claim 1, wherein the blade guide structure defines a U-shaped configuration with two blade guide surfaces that are adapted to be positioned on opposing sides of the fiber optic drop cable when the fiber optic drop cable has been mounted to the enclosure.

13. The enclosure of claim 1, wherein the strain relief members include fixation edges that dig into the cable jacket of the fiber optic drop cable for fixing the fiber optic drop cable axially.

14. A telecommunications enclosure assembly comprising:
   an enclosure; and
   a fiber optic drop cable mounted to the enclosure, the fiber optic drop cable including a plurality of optical fibers extending along a length and a cable jacket surrounding the optical fibers;
   wherein the enclosure includes first and second aligned cable ports at opposing ends of the enclosure, a strain relief member at each of the first and second cable ports for anchoring the fiber optic drop cable to the enclosure and to limit axial movement of the fiber optic drop cable relative to the enclosure, and a blade guide structure positioned between the first and second cable ports, the blade guide structure configured to abut a portion of the fiber optic drop cable extending between the first and second cable ports and defining at least one or more initial starting surfaces and a blade guide surface adapted to guide a cutting blade used for removing a portion of the cable jacket without contacting optical fibers of the fiber optic drop cable; wherein the one or more initial starting surfaces angle in toward the blade guide surface; and
   wherein a portion of the cable jacket has been cut to define an access region to provide access to at least one of the optical fibers, at least one of the optical fibers cut to provide a first cut end and a second cut end, both cut ends being routed out of the jacket through the access region, the first cut end terminated with a first optical connector and the second cut end terminated with a second optical connector, wherein the first and second optical connectors are positioned relative to the enclosure to be matable to optical cables that are external of the enclosure.

* * * * *